United States Patent
Kurata et al.

[11] Patent Number: 5,128,914
[45] Date of Patent: Jul. 7, 1992

[54] OPTICAL PICKUP APPARATUS UTILIZING A DIFFRACTION DEVICE

[75] Inventors: Yukio Kurata; Yoshio Yoshida; Yasuo Nakata; Takahiro Miyake, all of Tenri, Japan

[73] Assignee: Sharp Kabushiki Kaisha, Osaka, Japan

[21] Appl. No.: 464,013

[22] Filed: Jan. 12, 1990

[30] Foreign Application Priority Data

Jan. 13, 1989 [JP] Japan ................................ 1-17105

[51] Int. Cl.$^5$ .............................................. G11B 7/00
[52] U.S. Cl. ................................ 369/44.37; 369/44.38
[58] Field of Search ................... 369/44.37, 109, 112, 369/44.23, 44.41, 44.14

[56] References Cited

U.S. PATENT DOCUMENTS 4,742,506  5/1988  Fukumoto et al. ............. 369/112 X
4,750,162  6/1988  Tajima ........................ 369/44.37 X Primary Examiner—Robert L. Richardson

[57] ABSTRACT

An optical pickup apparatus comprising a diffraction device in which a laser beam from a light source is diffracted by the diffraction device to produce a main beam and two sub-beams which are focused on a recording medium, the beams reflected from the recording medium aare diffracted by the diffraction device to be directed to at least one photodetector, whereby a tracking error signal can be detected from output signals of the photodetector by the three-spot method that is so highly reliable that an offset never arises in the tracking error signal even when the optical axis of the optical system is displaced from a given position.

10 Claims, 13 Drawing Sheets

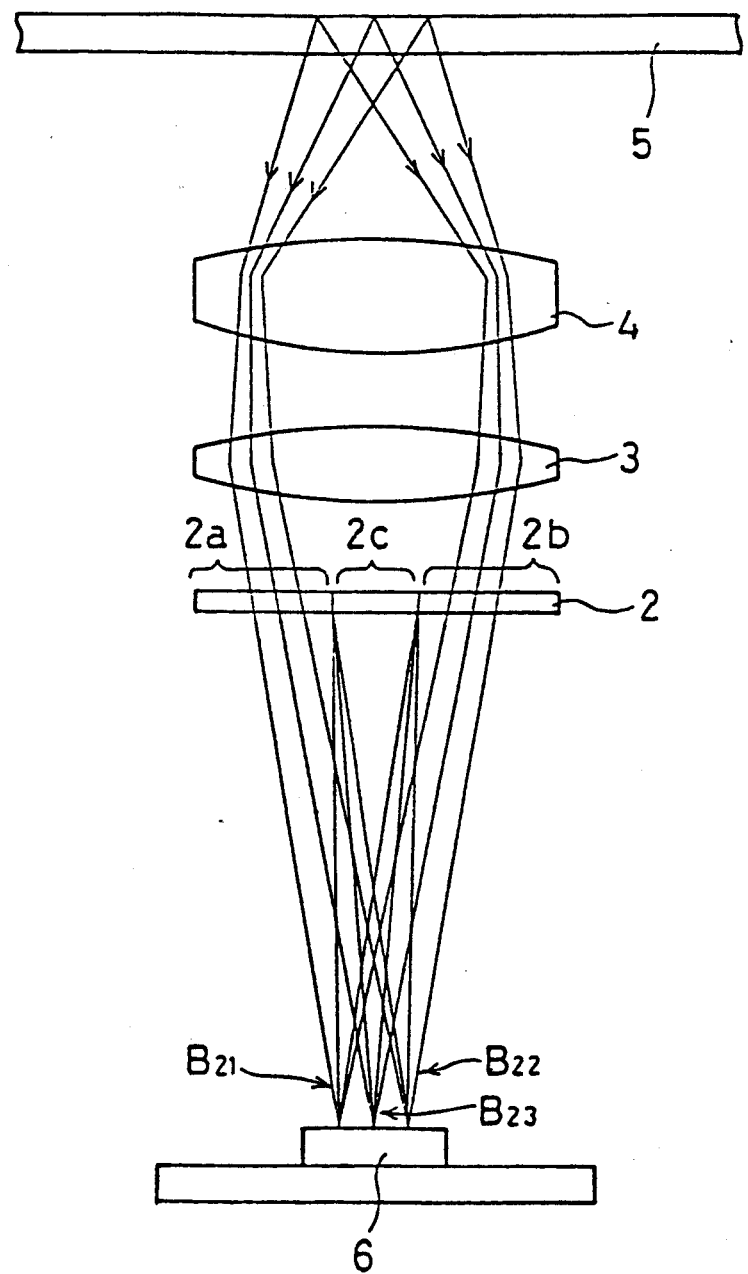

FIG. 4
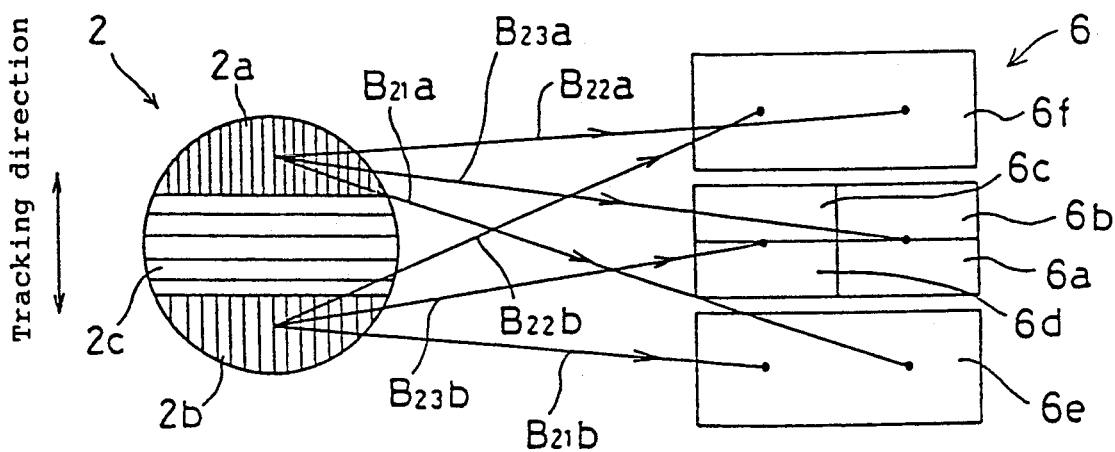
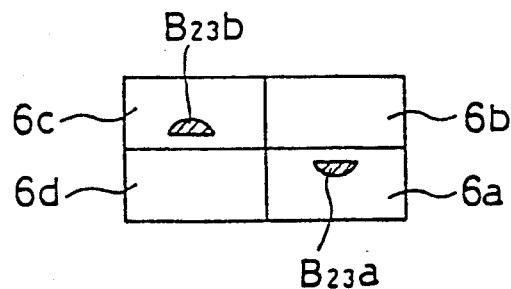
FIG. 5a
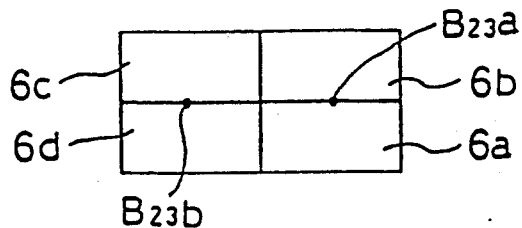
FIG. 5b
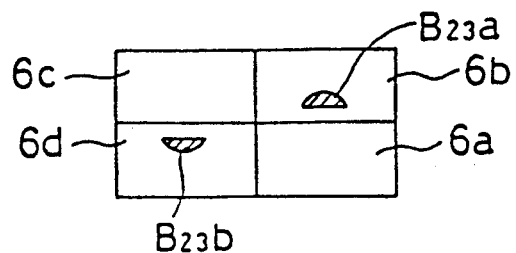
FIG. 5c

FIG. 8a
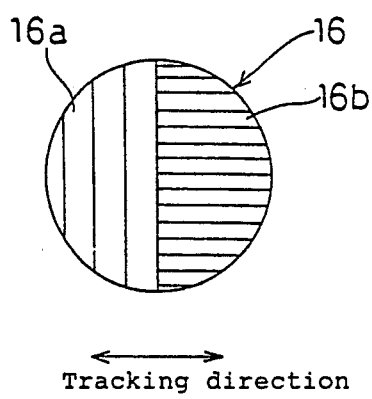
Tracking direction
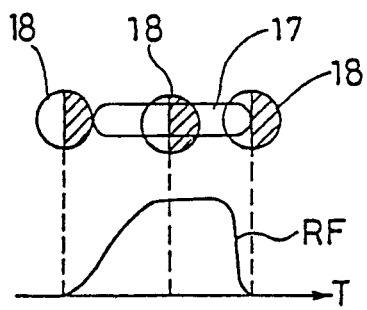
FIG. 8b
FIG. 9a
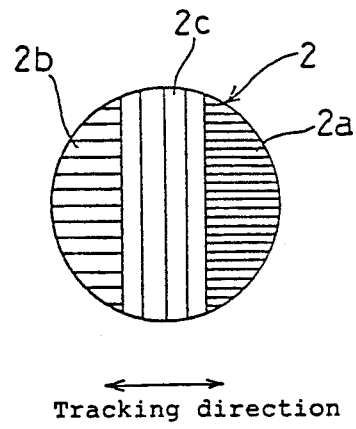
Tracking direction
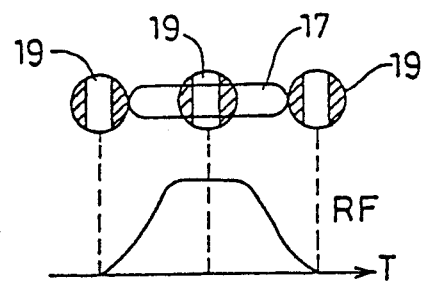
FIG. 9b FIG. 10
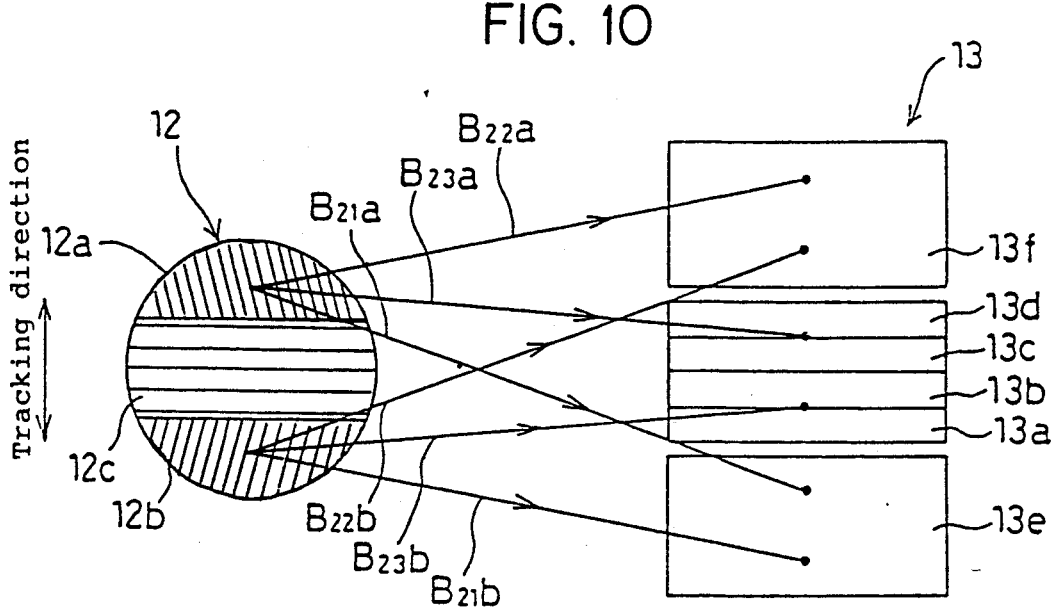
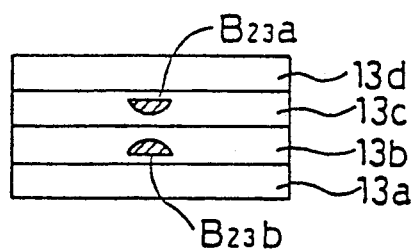
FIG. 11a
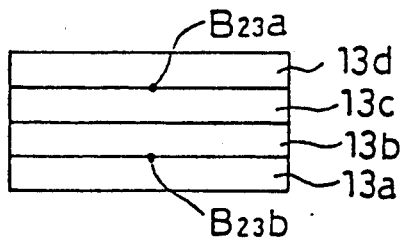
FIG. 11b
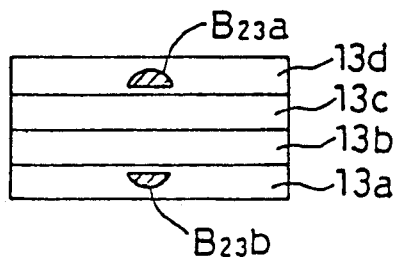
FIG. 11c FIG. 14a
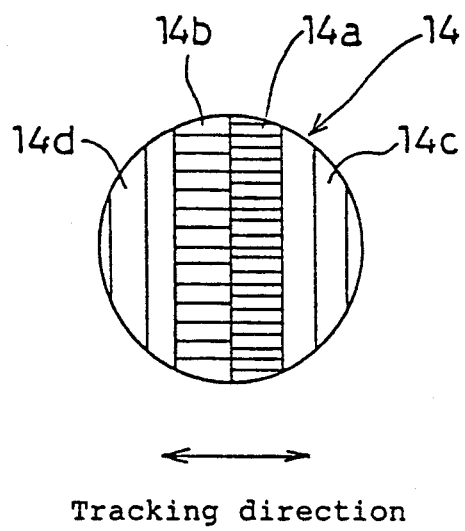
Tracking direction
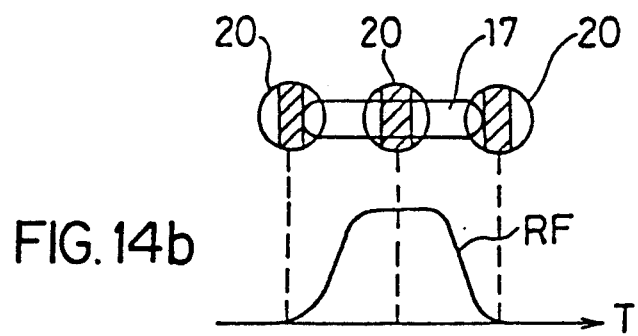
FIG. 14b

OPTICAL PICKUP APPARATUS UTILIZING A DIFFRACTION DEVICE

BACKGROUND OF THE INVENTION

1. Field of the Invention

This invention relates to an optical pickup apparatus that is used in a compact disc reproducing apparatus, a video disc reproducing apparatus, and the like.

2. Description of the Prior Art

An optical pickup apparatus that is used in compact disc reproducing apparatuses and the like uses a diffraction device or a holographic optical element, so that the number of components of the optical pickup apparatus can be reduced.

FIGS. 17 and 18 show such a conventional optical pickup apparatus, which comprises a light emitting device 31, a diffraction device 32, a collimating lens 33, an object lens 34, and photo-detectors 361 and 362. A light beam emitted from a light emitting device 31 first passes through a diffraction device 32 The diffracted beam of zero-order having thus passed through the diffraction device 32 is focused on the recording medium 35 through a collimating lens 33 and an object lens 34.

Then, the reflected beam from the recording face of the recording medium 35 again passes through the object lens 34, the collimating lens 33 and the diffraction device 32.

The beams reflected from the recording medium 35 pass through the object lens 34 and the collimating lens 33, and are diffracted by the diffraction device 32 The resulting first-order diffracted beams are introduced into the photo-detectors 361 and 362.

The diffraction device 32 is divided into two diffraction regions 32a and 32b by a division line that is parallel to the tracking direction. The first-order diffracted beam from the diffraction region 32a is focused on one photodetector 361 that is composed of photodetecting regions 36a and 36b and the first-order diffracted beam from the diffraction region 32b is focused on the other photodetector 362 that is composed of the photodetecting regions 36c and 36d. Output signals of the photodetecting regions 36a-36d are converted into a focus error signal FE, a tracking error signal TE and a reproduced information signal RF by a calculating circuit shown in FIG. 18. When the output signals of the photodetecting regions 36a-36d are represented, respectively, as Sa-Sd, the focus error signal FE is obtained by calculating (Sb+Sc)−(Sa+Sd) by means of summing circuits 37 and 38 and a subtracting circuit 39 based on the knife edge method The tracking error signal TE is obtained by calculating (Sc+Sd)−(Sa+Sb) by means of summing circuits 40 and 41 and a subtracting circuit 42 based on the push pull method The reproduced information signal RF is obtained by calculating (Sa+Sb+Sc+Sd) by means of summing circuits 40, 41 and 43.

In general, optical pickup apparatuses that are used in a compact disc reproducing apparatus and the like employ the three-spot method, in which two sub-beams for detecting a tracking error in addition to the main beam are used, in order to detect the tracking error signal TE.

On the contrary, the push pull method that is used in the above-mentioned conventional optical pickup apparatus is disadvantageous in that a displacement of the optical axis of an optical system from a given position causes an offset in the tracking error signal TE; for example, when the optical axis of the object lens 34 is displaced by a tracking servomechanism, the position of the peak of the intensity distribution of laser beams is displaced, as well, from the center of the optical axis. The push pull method is a method by which the light flux of these laser beams is divided into two portions that are along a division line parallel to the tracking direction and the tracking error signal TE is detected based on a difference in the intensity between these two light flux portions. Thus, a displacement of the peak position of the intensity distribution of the laser beams causes an offset in the tracking error signal TE.

In the above-mentioned conventional optical pickup apparatus using a diffraction device, an offset takes place in the tracking error signal TE due to a displacement of the optical axis of the optical system, which makes it impossible to achieve a precise tracking control.

SUMMARY OF THE INVENTION

The optical pickup apparatus of this invention, which overcomes the above-discussed and numerous other disadvantages and deficiencies of the prior art, comprises a light emitting device, a diffraction device, an optical system, and at least one photodetector, wherein a laser beam from said light emitting device is diffracted by said diffraction device to produce three separate light beams, one of which is a zero-order diffracted beam that is then focused as a main beam on a recording medium by means of said optical system and the others of which are two first-order diffracted beams that correspond to the two sub-beams obtained by the three-spot method, said two sub-beams being then focused on said recording medium by means of said optical system, and thereafter, the beams reflected from said recording medium are diffracted by said diffraction device through said optical system to be directed to said photodetector from which output signals are produced, a tracking error signal and a focus error signal being detected from said output signals.

In an embodiment, the diffraction device is divided into at least three diffracting regions that are positioned to be perpendicular to the tracking direction and substantially symmetrically with respect to a line passing on the optical axis of said optical system. At least one of said diffracting regions is provided with a grating by which said two sub-beams of the three-spot method are formed. The grating lines of said diffracting region are substantially perpendicular to the tracking direction. At least one of the remaining diffracting regions is provided with a grating by which the beams reflected from said recording medium are diffracted to be directed to said photodetector. The grating lines of said remaining diffracting region are substantially in the tracking direction.

In an embodiment, the sub-beams are focused on the recording medium in such a manner that they are positioned symmetrically with respect to said main beam and shift to the tracking direction.

In an embodiment, the light emitting device and said photodetector are incorporated into one body by disposing them within a package. A window of said package is sealed by glass to form a sealed space inside of said package and said diffraction device is disposed in front of said window. The diffraction device is disposed in said window instead of said glass.

Thus, the invention described herein makes possible the objectives of (1) providing an optical pickup apparatus by which a tracking error signal can be detected by the three-spot method that is so highly reliable that an offset never arises in the tracking error signal even when the optical axis of the optical system is displaced from a given position; and (2) providing an optical pickup apparatus in which a diffraction device is employed, which makes it possible to reduce the number of components of the optical system and to precisely control the tracking servomechanism of the optical pickup apparatus.

BRIEF DESCRIPTION OF THE DRAWINGS

This invention may be better understood and its numerous objects and advantages will become apparent to those skilled in the art by reference to the accompanying drawings as follows:

FIG. 1b is a side view showing the paths of the beams reflected from a disc of the optical pickup apparatus of FIG. 1a.

FIG. 4 is a schematic diagram showing the positional relationship between the grating of the diffractive device and the light-detecting regions of each of the photodetectors of the optical pickup apparatus of FIG. 2

FIGS. 5a-5c, respectively, are plan views showing the light-detecting regions of each of the photodetectors of the optical pickup apparatus of FIG. 2 based on the principle of the knife edge method.

FIG. 8a is a front view showing an arrangement of the grating of a diffraction device of a conventional optical pickup apparatus.

FIG. 8b is a schematic diagram showing the areas of light spots to be utilized when the diffraction device of FIG. 8a is used in the conventional optical pickup apparatus and the resulting reproduced information signal RF.

FIG. 9a is a schematic diagram showing an arrangement of the grating of the diffraction device of the optical pickup apparatus of FIG. 2

FIG. 9b is a schematic diagram showing the areas of light spots to be utilized when the diffraction device of FIG. 9a is used in the optical pickup apparatus of FIG. 2 and the resulting reproduced information signal RF.

FIG. 10 is a schematic diagram showing the positional relationship between the grating of a diffraction device and the light-detecting regions of each of the photodetectors used in another optical pickup apparatus of this invention.

FIGS. 11a to 11c, respectively are plan views showing the light-detecting regions of each of the photodetectors based on the knife edge method.

FIG. 14a is a schematic diagram showing an arrangement of the grating of the diffraction device of another optical pickup apparatus.

FIG. 14b is a schematic diagram showing the areas of light spots to be utilized when the diffraction device of FIG. 14a is used in the optical pickup apparatus and the resulting reproduced information signal RF.

DESCRIPTION OF THE PREFERRED EMBODIMENTS

This invention provides an optical pickup apparatus comprising a light emitting device, a diffraction device, and photodetectors. A laser beam from the light emitting device is diffracted by the diffraction device to produce three separate light beams, one of which is a zero-order diffracted beam that is focused as a main beam on a recording medium and the others of which are first-order diffracted beams that proceed in two different directions, i.e., the positive and negative directions, the first-order diffracted beams being focused as sub-beams on the recording medium in such a manner that they are positioned symmetrically with respect to the main beam and shift in the tracking direction. The sub-beams are those obtained by the three-spot method.

The beams reflected from the recording medium are diffracted by the diffractive device to produce the first-order diffracted beams, which are then focused on the photodetectors. When the regions of the diffraction device that produce the sub-beams of the three-spot method have brazing characteristics so as to strengthen the light intensity of the first-order diffracted beam alone that proceeds in the positive direction, a sufficient sensitivity is obtainable by means of a single photodetector instead of plural photodetectors.

Each of the photodetectors is divided into at least three regions in the same way as that of the well known three-spot method and the regions are irradiated with the corresponding beams diffracted by the diffraction device. The diffracted beam resulting from the main beam is focused on the photodetectors to produce an output signal, from which a focus error signal can be detected by a kind of knife edge method. A tracking error signal can be detected based on the three-spot method from a difference between the light intensities of the diffracted beams resulting from the sub-beams.

According to this invention, the tracking error signal can be detected based on the three-spot method, and thus an offset never arises in the tracking error signal even when the optical axis of the optical system is displaced from a given position. Moreover, because of the use of a diffraction device, the number of components of the optical system can be reduced.

When the light emitting device and the photodetectors are incorporated into one body by disposing them within a package and the diffraction device is used as a window that seals the package, the production cost of the optical pickup apparatus can be lowered.

EXAMPLE 1

Figure 1A:
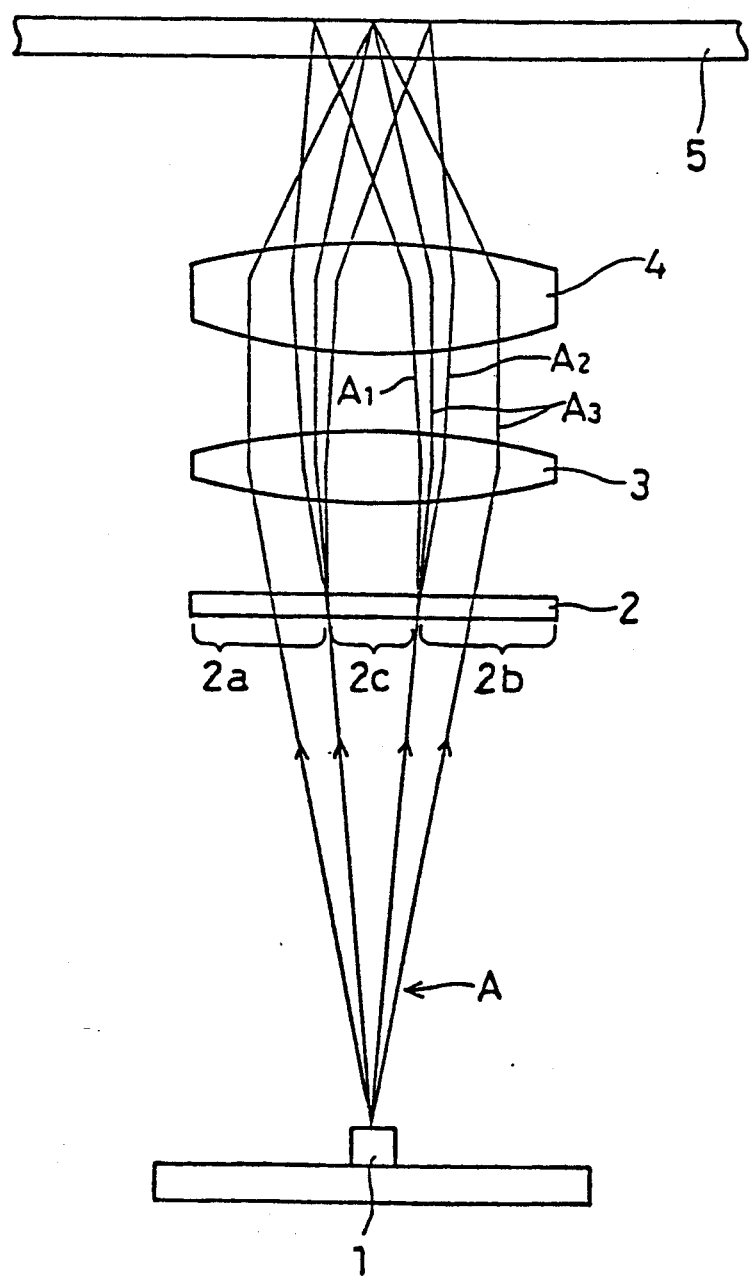
FIG. 1a is a side view showing the paths of laser beams emitted from a light emitting device of an optical pickup apparatus of this invention.
Figure 2:
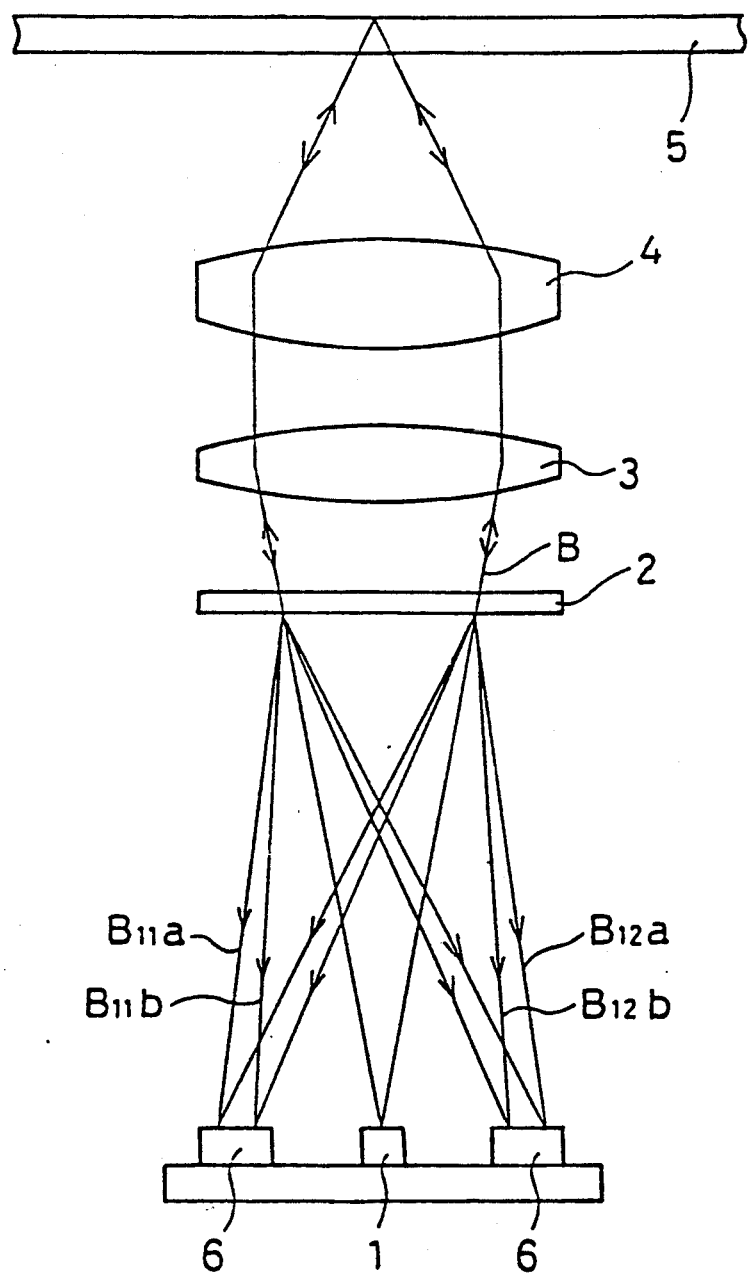
FIG. 2 is a front view showing the paths of the beams of the apparatus of FIGS. 1a and 1b.

FIGS. 1a, 1b and 2 show an optical pickup apparatus such as a compact disc reproducing apparatus of this invention, which comprises a light emitting device 1, a diffraction device 2, a collimating lens 3, and an object lens 4 in that order. The optical pickup apparatus further comprises two photodetectors 6 and 6 that are disposed on both sides of the light emitting device 1 (FIG. 2). A laser beam A from the light emitting device 1 is diffracted by the diffraction device 2 and introduced into the recording surface of a disc 5 through the collimating lens 3 and the object lens 4. As shown in FIG. 1a, the diffraction device 2 is divided into three diffraction regions 2a, 2b and 2c by imaginary division lines that are perpendicular to the tracking direction. The center region of the diffraction device 2, i.e., the diffraction region 2c, has a grating by which the first-order diffraction beams in the positive and negative directions that are derived from the laser beam A emitted from the light emitting device 1 become sub-beams $A_1$ and $A_2$, respectively, that proceed to the recording surface of the disc 5 in different directions corresponding to those based on the three-spot method. Both side regions of the diffraction device 2, i.e., the diffraction regions 2a and 2b, have gratings by which, as shown in FIG. 2, the first-order diffracted beams $B_{11}a$ and $B_{11}b$ in the positive direction and the first-order diffracted beams $B_{12}a$ and $B_{12}b$ in the negative direction deriving from the laser beams B reflected from the disc 5 proceed toward both sides of the light emitting device 1. The zero-order diffracted beam that is produced at the time when the laser beam A from the light emitting device 1 passes through the three regions 2a, 2b and 2c of the diffraction device 2 becomes the main beam $A_3$ that corresponds to that of the three-spot method.

As shown in FIG. 2, the two photodetectors 6 are disposed on both sides of the light emitting device 1. The first-order diffracted beams $B_{11}a$ and $B_{12}a$ that are produced from the reflected light B by the region 2a of the diffraction device 2 are focused on the two photodetectors 6, respectively. The first-order diffracted beams $B_{11}b$ and $B_{12}b$ that are produced from the reflected light B by the region 2b of the diffraction device 2 are also focused on the two photodetector 6, respectively. Moreover, as shown in FIG. 1c, the beams $B_{21}$–$B_{23}$ that correspond to the beams $A_1$–$A_3$ reflected from the disc 5 are focused on each of the photodetectors 6.

When the diffraction device 2 is designed so that the regions 2a and 2b have brazing characteristics so as to increase the light intensity of, for example, the first-order diffracted beams $B_{11}a$ and $B_{11}b$ alone, a sufficient sensitivity can be obtained by only one photodetector 6.

Each of the photodetectors 6 are composed of, as shown in FIG. 4, six lights-detecting regions 6a–6f, each of which can produce output. The regions 6a, 6b, 6c, and 6d are adjacent to each other by a cross-shaped division line. The beams $B_{23}a$ and $B_{23}b$ that correspond to the main beams $A_3$ reflected from the disc 5 are focused on the division line of these regions 6a–6d. Since the beams $B_{23}a$ and $B_{23}b$ are produced by dividing the reflected light B by means of the regions 2a and 2b of the diffraction device 2, respectively, they have the same effect as those obtained by the knife edge method: namely, when the laser beam A from the light emitting device 1 is precisely focused on the recording surface of the disc 5, as shown in FIG. 5b, the resulting beams $B_{23}a$ and $B_{23}b$ are focused on the division lines of the light-detecting regions 6a and 6b and the light-detecting regions 6c and 6d, respectively; and when the laser beam A is focused onward or backward of the recording surface of the disc 5, as shown in FIGS. 5a and 5b, semicircular-shaped spots are formed in the light-detecting regions 6a and 6c or the light-detecting regions 6b and 6d depending upon the distance (displacement) between the focusing point and the recording surface of the disc 5.

The beams $B_{21}a$ and $B_{21}b$, and $B_{22}a$ and $B_{22}b$ that correspond to the sub-beams $A_1$ and $A_2$, respectively, are focused on the above-mentioned light-detecting regions 6e and 6f, respectively. The light amounts of beams $B_{21}a$ and $B_{21}b$, and $B_{22}a$ and $B_{22}b$ reversely vary with the amount of displacement from the focusing point in the tracking direction of the recording surface of the disc 5 according to the three-spot method.

The light-detecting regions 6a–6f of the photodetector 6 are formed so as to be long enough in a direction perpendicular to the tracking direction to follow the movement of the focusing point due to the fluctuation of the oscillation wavelength of the light emitting device 1 and/or the assembly errors of this optical pickup apparatus.

Figure 3:
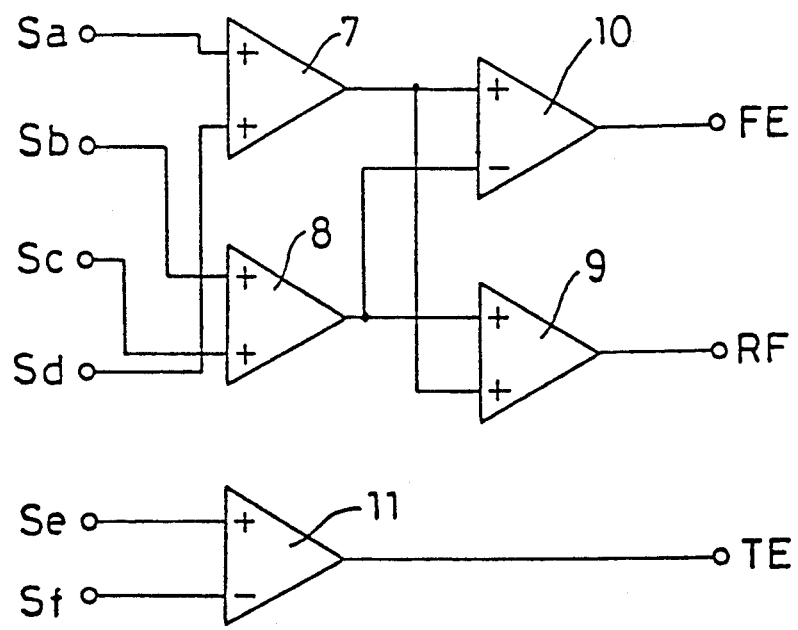
FIG. 3 is a block diagram showing a signal detecting circuit of an optical pickup apparatus of this invention.

The output signals Sa–Sf of the above-mentioned light-detecting regions 6a–6f are input into a signal detecting circuit shown in FIG. 3, which comprises three summing circuits 7, 8 and 9 and two subtracting circuits 10 and 11. The output signals Sa and Sd are summed up by the summing circuit 7 to produce an intermediate signal $S_1$. The output signals Sb and Sc are summed up by the summing circuit 8 to produce an intermediate signal $S_2$. The intermediate signals $S_1$ and $S_2$ are summed up by the summing circuit 9 to produce the reproduced information signal RF. The intermediate signal $S_1$ is deducted from the intermediate signal $S_2$ by the subtracting circuit 10 to produce the focus error signal FE. The output signal Se is deducted from the output signal Sf by the subtracting circuit 11 to produce the tracking error signal TE.

Figure 6:
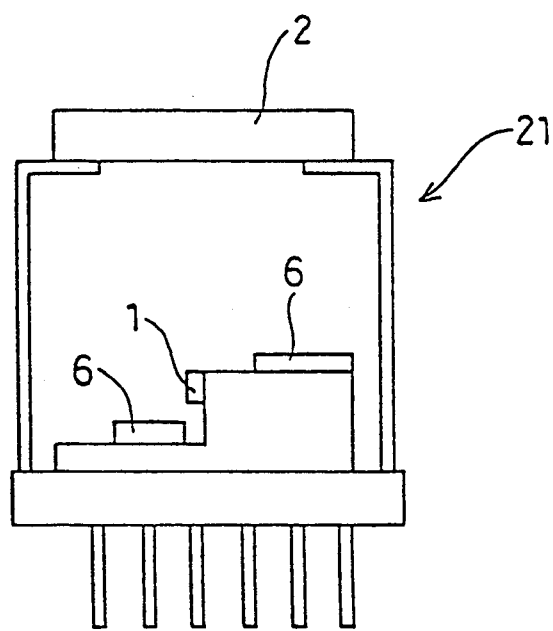
FIG. 6 is a front sectional view showing a package for the light emitting device of this invention.
Figure 7:
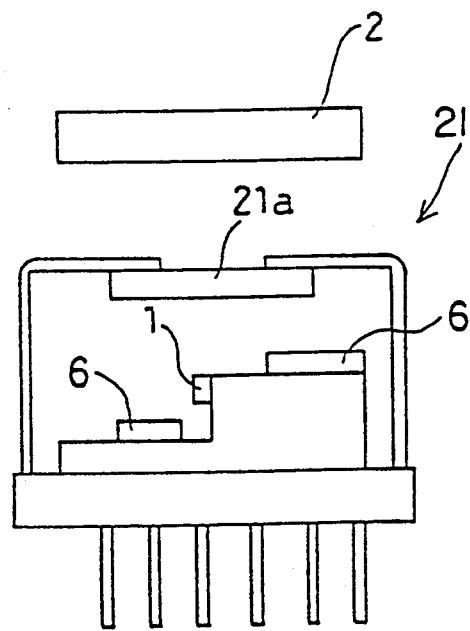
FIG. 7 is a front sectional view showing another package for the light emitting device of this invention.

The light emitting device 1 and the photodetectors 6 are, as shown in FIG. 6, disposed within a package 21, so that they are incorporated into one body. In general, such a package 21 is designed so that it holds the light emitting device 1 and the photodetectors 6 therein and it is sealed by a hermetic seal by means of glass 21a so as to protect these elements from the air, including moisture, oxygen, or the like. The diffraction device 2 is disposed in front of the glass 21a. In this example, as shown in FIG. 6, the diffraction device 2 is fixed onto the package 21 instead of the glass 21a to seal the package 21, thereby attaining the reduction of the number of components and steps of the assembly of the optical pickup apparatus.

The optical pickup apparatus having the above-mentioned structure operates as follows:

The laser beam A from the light emitting device 1 is diffracted by the three regions 2a, 2b, and 2c of the diffraction device 2 to produce a zero-order diffracted beam that is focused as a main beam $A_3$ on the recording surface of the disc 5. On the other hand, first-order diffracted beams that proceed in the positive and negative directions are produced as sub-beams $A_1$ and $A_2$ by the center region 2c of the diffraction device 2, the sub-beams $A_1$ and $A_2$ being focused on the recording surface of the disc 5 in such a manner that they are positioned symmetrically with respect to the above-mentioned main beam $A_3$, but shift in the tracking direction.

The beams $B_{21}$-$B_{23}$ that correspond to the beams $A_1$-$A_3$, respectively, reflected from the recording surface of the disc 5 are then diffracted by the regions 2a and 2b of the diffraction device 2 to produce the first-order diffracted beams, which are then focused on the two photodetectors 6, respectively.

Then, the light-detecting regions 6a, 6b, 6c, and 6d of each of the photodetectors 6 are irradiated with the beams $B_{23}a$ and $B_{23}b$, which correspond to the main beam $A_3$ reflected from the disc 5, to produce output signals Sa, Sb, Sc, and Sd, respectively. These output signals Sa–Sd are summed up by the summing circuits 7, 8, and 9 of the signal detecting circuit to produce the reproduced information signal RF. These output signals Sa–Sd are computed by the summing circuits 7 and 8 and the subtracting circuit 10 to produce the focus error signal FE according to the knife edge method. Moreover, the light-detecting regions 6e and 6f are irradiated with the beams $B_{22}a$ & $B_{22}b$ and $B_{21}a$ & $B_{21}b$, which correspond to the sub-beams $A_1$ and $A_2$, respectively, reflected from the disc 5, to produce the output signals Se and Sf, which are then computed by the subtracting circuit 11 of the signal detecting circuit according to the three-spot method to produce the tracking error signal TE.

In this way, the optical pickup apparatus of this example can detect the tracking error signal TE based on the three-spot method, so that there is no possibility that an offset will arise due to the displacement of the optical axis of the optical system. Moreover, the number of components of the optical system can be reduced by the use of the diffraction device 2.

Because of the quality of the reproduced information signal, it is preferable that the regions 2a, 2b and 2c of the diffraction device 2 are positioned perpendicular to the tracking direction and substantially symmetrically with respect to a line that passes on the optical axis.

The applicant of this invention has filed an application for a patent on an optical pickup apparatus in Japan (Application No 63-97496), which comprises, as shown in FIG. 8a, a diffraction device 16 composed of two regions 16a and 16b. The region 16a has a grating to produce sub-beams that are obtained by the three-spot method and the region 16b has a grating to have the beams reflected from a disc focus on photodetectors. However, such an apparatus utilizes, as shown in FIG. 8b, only the slash mark portion of a light spot 18 that passes through each pit 17 of the disc, and accordingly the resulting reproduced information signal RF becomes an asymmetric shape, which deteriorates the quality and increases the jitter of the signal.

On the contrary, as mentioned above, when the regions 2a, 2b and 2c of the diffraction device 2 are positioned so as to be perpendicular to the tracking direction and substantially symmetrically with respect to a line passing on the optical axis, that is, when the diffraction device 2 is formed in such a way as that of FIG. 9a, as seen from FIG. 9b, the slash mark portions of each of the light spots 19 that are symmetric with respect to a line passing on the center of each pit 17 are utilized, resulting in a reproduced information signal RF that has a symmetrical shape, which makes it possible to improve the signal quality and to suppress the occurrence of jitters.

EXAMPLE 2

The optical pickup apparatus of this example comprises, as shown in FIG. 10, a diffraction device 12 and photodetectors 13. Each photodetector 13 has light-detecting regions 13e and 13f corresponding to the light-detecting regions 6e and 6f of Example 1 shown in FIG. 4 and the light-detecting regions 13a–13d corresponding to the light-detecting regions 6a–6d of Example 1 shown in FIG. 4. The regions 13e and 13f are equivalent to the regions 6e and 6f, whereas the regions 13a–13d are juxtaposed unlike regions 6a–6d.

The diffraction device 12 has the diffracting regions 12a–12c that correspond to the diffracting regions 2a–2c of the diffraction device 2 shown in FIG. 4. The region 12c is equivalent to the region 2c, whereas the regions 12a and 12b are different from the regions 2a and 2b. More particularly, the grating lines of each of the regions 2a and 2b are parallel to each other and the pitch of the grating lines of the region 2a is smaller than that of the region 2b, so that the beams $B_{21}a$-$B_{23}a$ that have been diffracted by the region 2a are focused at a position that is further than the position at which the beams $B_{21}b$-$B_{23}b$ that have been diffracted by the region 2b are focused. On the other hand, with the diffraction device 12 of FIG. 10, the pitch of the grating lines of the region 12a is the same as that of the region 12b, but the grating lines of the region 12a are inclined in a direction that is different from the direction in which the grating lines of the region 12b are inclined, so that the beams that have been diffracted by the regions 12a and 12b are focused on each of the photodetectors 13 in an alternate juxtaposition manner.

When the laser beam A is precisely focused on the recording surface of the disc 5, as shown in FIG. 11b, the beams $B_{23}a$ and $B_{23}b$ are focused on the division line of the light-detecting regions 13c and 13d and the division line of the light-detecting regions 13a and 13d, respectively, to form spots, respectively.

When the laser beam A is focused onward or backward of the recording surface of the disc 5, as shown in FIGS. 11a and 11c, semicircular-shaped spots are formed in the light-detecting regions 13b and 13c or the light-detecting regions 13a and 13d depending upon the distance (displacement) between the focusing point and the recording surface of the disc 5.

Based on the output signals Sa–Sf of the above-mentioned light-detecting regions 13a–13f of the photodetector 13, the focus error signal FE, the tracking error signal TE and the reproduced information signal RF can be obtained by means of the signal detecting circuit of FIG. 3 in the same way as that of Example 1.

When the optical pickup apparatus of this example is designed so that the regions 12a, 12b and 12c of the diffraction device 12 are positioned so as to be perpendicular to the tracking direction and substantially symmetrically with respect to a line passing on the optical axis as well, a reproduced information signal RF that is of a symmetrical shape is obtainable, thereby attaining an improvement of the quality of the signal and a suppression of jitters.

EXAMPLE 3

Figure 12:
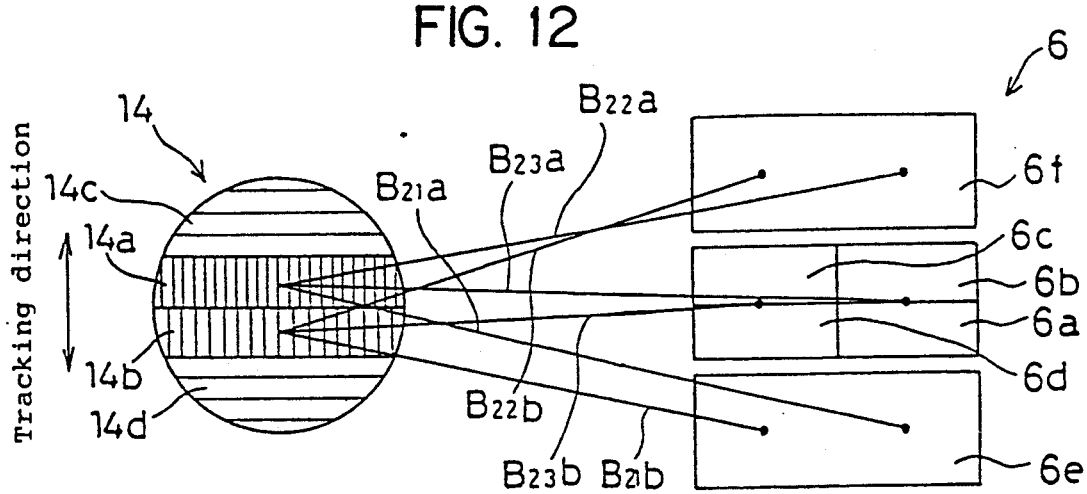
FIG. 12 is a schematic diagram showing the positional relationship between the grating of a diffraction device and the light-detecting regions of each of the photodetectors used in another optical pickup apparatus of this invention.

The optical pickup apparatus of this example comprises, as shown in FIG. 12, a diffraction device 14 and photodetectors 6 that are the same as those of FIG. 4.

The diffraction device 14 is divided into four regions 14a–14d. The regions 14a and 14b that are positioned in the center area of the diffraction device 14 have grating by which the beams B reflected from the disc 5 are diffracted to be focused on the photodetectors 6. The pitch of the grating lines of the region 14a is smaller than that of the region 14b like the relationship between the gratings of the regions 2a and 2b shown in FIG. 4, so that the beams $B_{21}a$–$B_{23}a$ that have been diffracted by the diffracting region 14a are focused at a position that is further than the position at which the beams $B_{21}b$–$B_{23}b$ that have been diffracted by the diffracting region 14b are focused. The diffracting regions 14c and 14d have gratings, respectively, for forming sub-beams that are obtainable by the three-spot method.

Figure 13A:
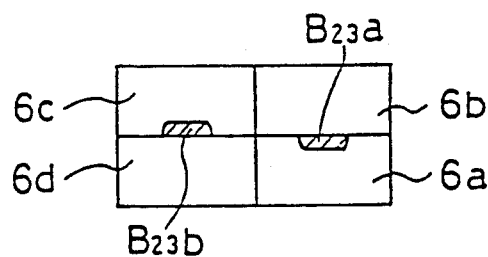
FIGS. 13a to 13c, respectively, are plan views showing the light-detecting regions of each of the photodetectors based on the knife edge method.
Figure 13B:
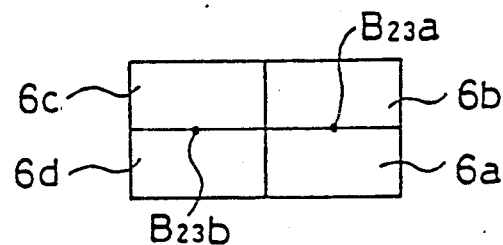
Figure 13C:
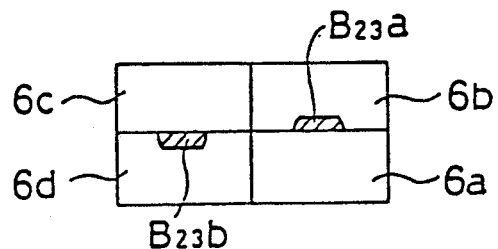

The principle of the detection of focuses is based on the use of a kind of knife edge method in the same way as those of Examples 1 and 2. As shown in FIGS. 13a to 13c, the spread of each of the spots formed on each of the photodetectors 6 varies depending upon the focusing state of the laser beam that takes place on the recording surface of the disc 5. Based on the output signals Sa–Sf of the light-detecting regions 6a–6f of each of the photodetectors 6, the focus error signal FE, the tracking error signal TE, and the reproduced information signal RF can be obtained by means of the signal detecting circuit of FIG. 3.

When the optical pickup apparatus of this example is likewise designed so that the regions 14a–14d of the diffraction device 14 are positioned to be perpendicular to the tracking direction and substantially symmetrically with respect to a line passing on the optical axis, that is, when the diffraction device 14 is formed such as that of FIG. 14a, as seen from FIG. 14b, the slash mark portion of each of the light spots 20 that pass through pits 17 of the disc is utilized, the slash mark portion being symmetric with respect to a line passing on the center of each pit 17, resulting in a reproduced information signal RF that has a symmetrical shape, which makes it possible to improve the quality of the signal and to suppress the occurrence of jitters.

EXAMPLE 4

Figure 15:
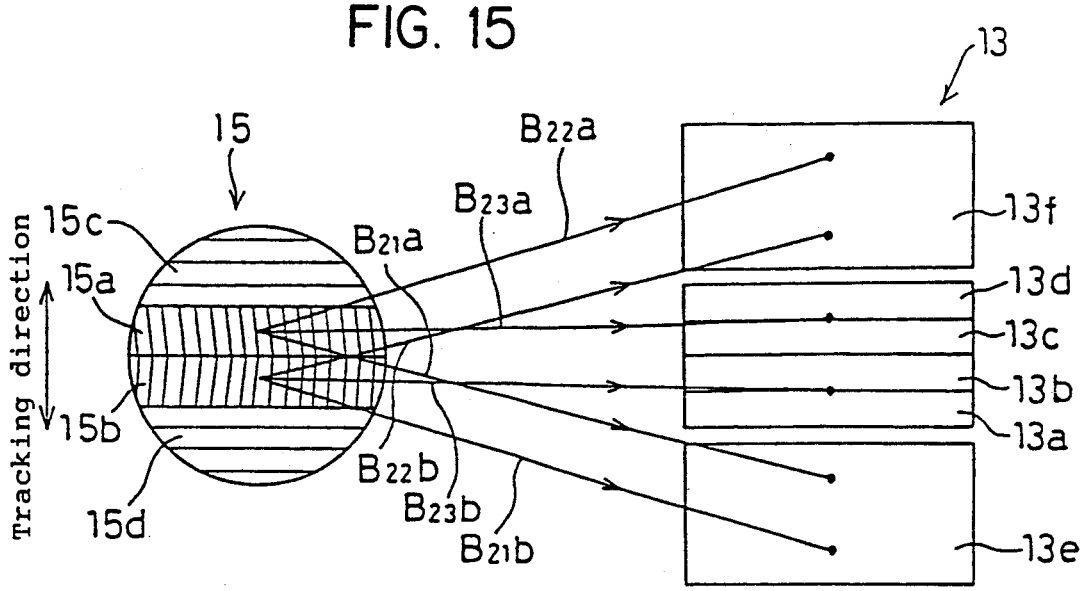
FIG. 15 is a schematic diagram showing the positional relationship between the grating of a diffraction device and the light-detecting regions of each of the photodetectors used in another optical pickup apparatus of this invention.
Figure 16A:
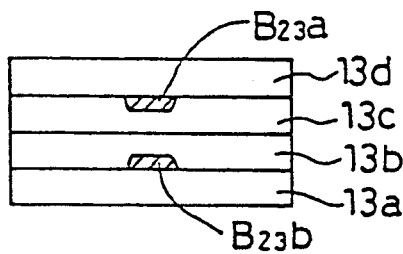
FIGS. 16a to 16c, respectively, are plan views showing the light-detecting regions of each of the photodetectors based on the knife edge method.
Figure 16B:
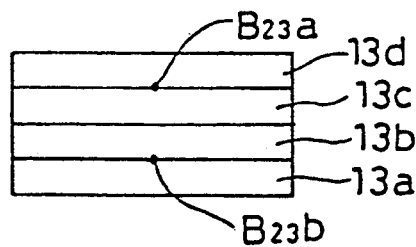
Figure 16C:
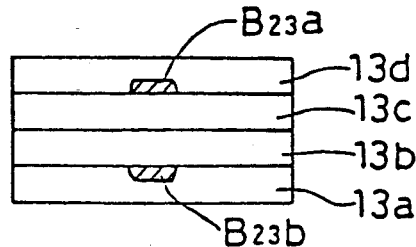
Figure 17:
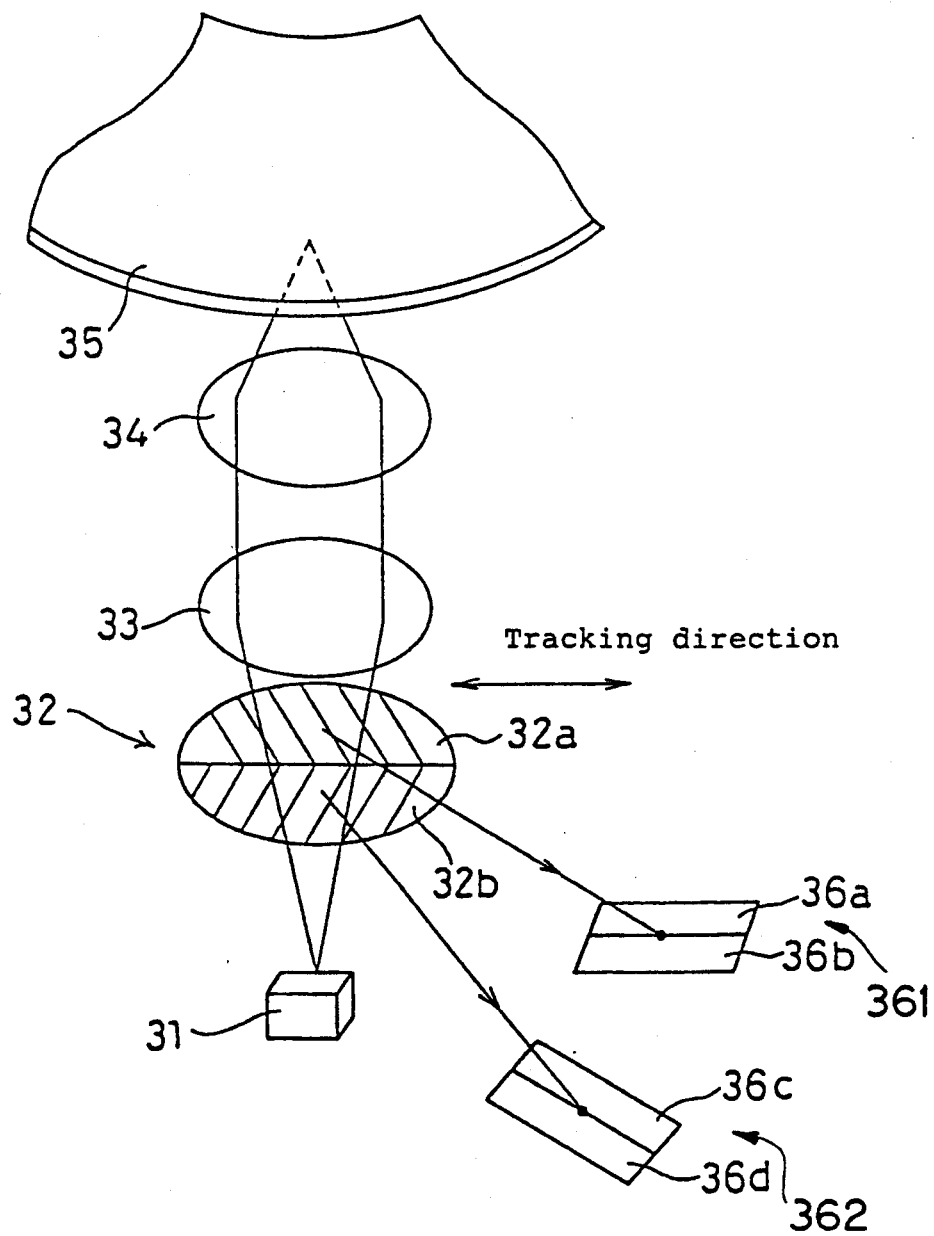
FIG. 17 is a perspective view showing a conventional optical pickup apparatus that uses a diffraction device.
Figure 18:
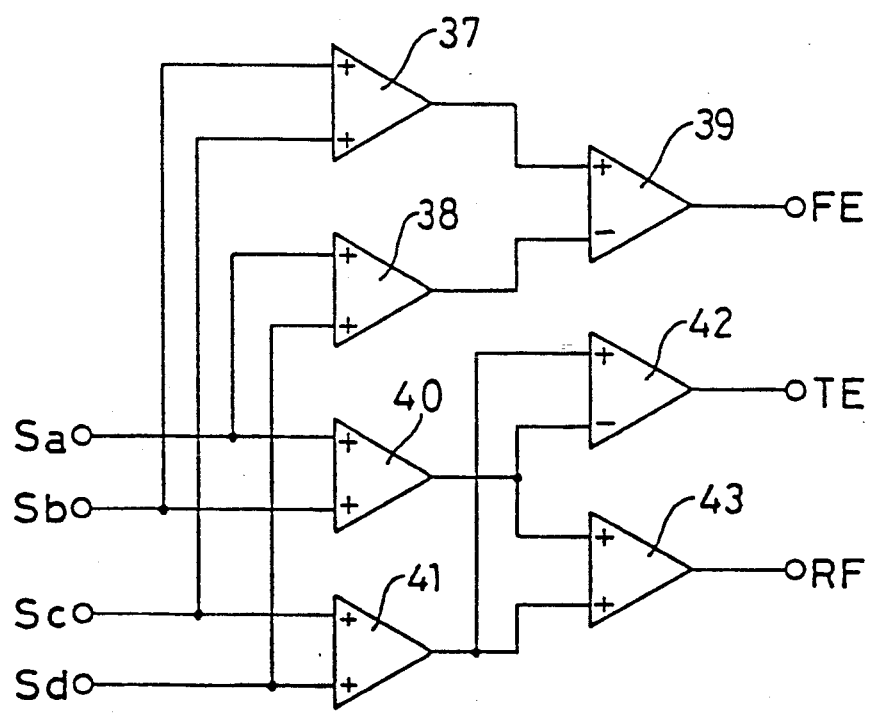
FIG. 18 is a block diagram showing a signal detecting circuit of the conventional optical pickup apparatus of FIG. 17.

The optical pickup apparatus of this example comprises, as shown in FIG. 15, a diffraction device 15 and photodetectors 13 that are the same as those of FIG. 10. The diffraction device 15 is divided into four regions 15a–15d. The regions 15a and 15b that are positioned in the center area of the diffraction device 15 have gratings by which the beams B reflected from the disc 5 are diffracted to be focused on the photodetectors 13. The grating of the region 15a has the same pitch as that of the region 15b, but the grating lines of the region 15a are inclined in a direction that is different from the direction in which the grating lines of the region 15b are inclined, so that the diffracted beams from the regions 15a and 15b are focused on the photodetectors 13 in an alternate juxtaposition manner like those from the diffraction device 12 shown in FIG. 10. The principle of the detection of focuses in the above-mentioned construction is such as those of FIGS. 16a to 16c and the operation of the optical pickup apparatus and the detection of each of the signals are the same as those of the above-mentioned examples.

When the optical pickup apparatus of this example is likewise designed so that the regions 15a–15d of the diffraction device 15 are positioned to be perpendicular to the tracking direction and substantially symmetrically with respect to a line passing on the optical axis, a reproduced information signal RF that has a symmetrical shape is obtainable, which makes it possible to improve the quality of the signal and to suppress jitters.

It is understood that various other modifications will be apparent to and can be readily made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which this invention pertains.

What is claimed is:

1. An optical pickup apparatus comprising a light emitting device, a diffraction device, an optical system, and at least one photodetector, wherein a laser beam from said light emitting device is diffracted by said diffraction device to produce three separate light beams, one of which is a zero-order diffracted beam that is then focused as a main beam on a recording medium by means of said optical system and the others of which are two first-order diffracted beams that correspond to the two sub-beams obtained by the three-spot method, said two sub-beams being then focused on said recording medium by means of said optical system, and thereafter, the beams reflected from said recording medium are diffracted by said diffraction device through said optical system to be directed to said photodetector from which output signals are produced, a tracking error signal and a focus error signal being detected from said output signals.

2. An optical pickup apparatus according to claim 1, wherein said diffraction device is divided into at least three diffracting regions that are positioned to be perpendicular to the tracking direction and substantially symmetrically with respect to a line passing on the optical axis of said optical system.

3. An optical pickup apparatus according to claim 2, wherein at least one of said diffracting regions is provided with a grating by which said two sub-beams of the three-spot method are formed.

4. An optical pickup apparatus according to claim 3, wherein the grating lines of said diffracting region are substantially perpendicular to the tracking direction.

5. An optical pickup apparatus according to claim 3, wherein at least one of the remaining diffracting regions is provided with a grating by which the beams reflected from said recording medium are diffracted to be directed to said photodetector.

6. An optical pickup apparatus according to claim 5, wherein the grating lines of said remaining diffracting region are substantially in the tracking direction.

7. An optical pickup apparatus according to claim 1, wherein said sub-beams are focused on the recording medium in such a manner that they are positioned symmetrically with respect to said main beam and shift to the tracking direction.

8. An optical pickup apparatus according to claim 1, wherein said light emitting device and said photodetector are incorporated into one body by disposing them within a package.

9. An optical pickup apparatus according to claim 8, wherein a window of said package is sealed by glass to form a sealed space inside of said package and said diffraction device is disposed in front of said window.

10. An optical pickup apparatus according to claim 9, wherein said diffraction device is disposed in said window instead of said glass.

* * * * *

UNITED STATES PATENT AND TRADEMARK OFFICE
CERTIFICATE OF CORRECTION

PATENT NO. : 5,128,914
DATED : July 7, 1992
INVENTOR(S) : Yukio Kurata; Yoshio Yoshida; Yasuo Nakata; Takahiro Miyake It is certified that error appears in the above-identified patent and that said Letters Patent is hereby corrected as shown below:

Title page, item [30] Foreign Application Priority Data, change
" Jan. 13, 1989 [JP] Japan................1-17105"

to

--Jan. 13, 1989 [JP] Japan ...........1-7105--

Signed and Sealed this

Twenty-first Day of September, 1993

Attest:

BRUCE LEHMAN

*Attesting Officer*  *Commissioner of Patents and Trademarks*